United States Patent
DeTroyer et al.

[11] 3,876,352
[45] Apr. 8, 1975

[54] COLLECTING MECHANISM FOR PARTS MADE BY POWDER COMPACTING APPARATUS

[75] Inventors: Georges D. DeTroyer, Grosse Ile; Raymond P. DeSantis, Royal Oak, both of Mich.

[73] Assignee: Wolverine-Pentronix, Inc., Lincoln Park, Mich.

[22] Filed: Sept. 17, 1973

[21] Appl. No.: 397,914

Related U.S. Application Data

[63] Continuation of Ser. No. 173,452, Aug. 20, 1971, abandoned.

[52] U.S. Cl. .................. 425/78; 425/437; 302/25
[51] Int. Cl. ..................... B29c 3/00; B30b 15/08
[58] Field of Search ............ 425/78, 168, 437, 344; 302/25

[56] References Cited
UNITED STATES PATENTS

| | | | |
|---|---|---|---|
| 1,082,113 | 12/1913 | Diden | 302/25 |
| 2,744,286 | 5/1956 | Carpenter et al. | 425/437 X |
| 3,328,840 | 7/1967 | Vinson | 425/78 |
| 3,541,641 | 11/1970 | Hashinoto | 425/344 X |
| 3,561,054 | 2/1971 | Smith | 425/437 X |
| 3,561,056 | 2/1971 | Smith et al. | 425/168 X |
| 3,574,892 | 4/1971 | Smith | 425/78 |
| 3,593,377 | 7/1971 | Edwards | 425/437 X |
| 3,645,658 | 2/1972 | DeTroyer | 425/78 |

Primary Examiner—J. Howard Flint, Jr.
Attorney, Agent, or Firm—Hauke Gifford Patalidis & Dumont

[57] ABSTRACT

A collecting mechanism for collecting parts made by an apparatus making articles compacted from powder. The parts compacted by the apparatus are, upon ejection from die cavities in which they are molded under pressure, individually picked up and transferred through a conduit to a remotely located discharge station. Aspirator means connected to the conduit between the parts pickup means and the discharge station creates a partial vacuum in the conduit so as to gently lift the parts through the pickup means and the conduit and carry them to the aspirator means where they are transferred to another conduit in which a gentle blast of pressurized air carries the parts to the remotely located discharge station where the parts are collected in suitable receptacles.

3 Claims, 2 Drawing Figures

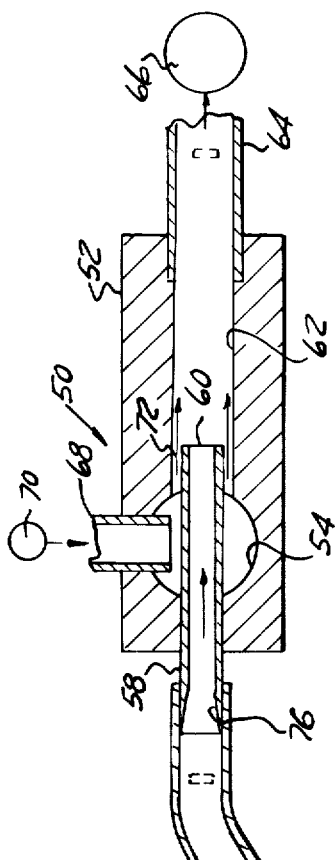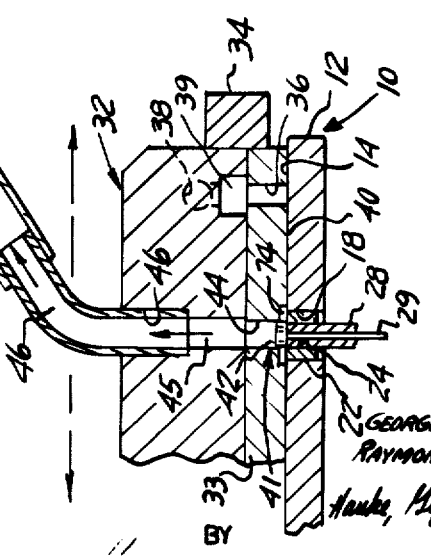

3,876,352

COLLECTING MECHANISM FOR PARTS MADE BY POWDER COMPACTING APPARATUS

CROSS REFERENCE TO RELATED APPLICATIONS

The present application is a continuation of application Ser. No. 173,452, filed Aug. 20, 1971, now abandoned, and is related in part to U.S. Pat. Nos. 3,328,840, 3,344,213, 3,328,842, 3,414,940, 3,415,142, 3,574,892, and to application Ser. No. 861,611 now U.S. Pat. No. 3,645,658, issued Feb. 29, 1973, all assigned to the same assignee as the present application.

BACKGROUND OF THE INVENTION

I. Field of the Invention

The present invention relates to powder compacting apparatus and, in particular, to an improved means for picking up compacted powder articles which have been ejected from the compacting apparatus and for transferring the compacted articles to a remotely located discharge station.

II. Description of the Prior Art

The present invention is an improvement over the pickup means for compacted powder articles or parts of the character disclosed as part of the powder compacting apparatus described in the aforementioned Letters Patent. The powder compacting apparatus described therein consists of a machine for the purpose of manufacturing compacted articles, such as toroids, beads, pellets and the like, made of powder ferrite, glass, metals, or other comparable powder substances capable of forming a compacted article upon the application of pressure in a confined die cavity.

In the powder compacting apparatus disclosed in the aforementioned Letters Patent, the articles are compacted and formed in a multi-cavity die, automatically ejected from the die cavities, picked up by a pickup head, and dropped by the pickup head through discharge ports in the die plate into suitable receptacles.

In such compacting apparatus, relatively small articles or parts are manufactured at a high rate of production which results in problems in picking up the finished compacted articles for disposal into separate containers. For a proper operation of the apparatus, the finished articles must be picked up and discharged at the same rate at which the apparatus operates and in synchronism with the various work cycles of the apparatus, otherwise the compacted articles may be damaged. The aforementioned Letters Patent disclose ejecting the finished compacted articles from the die cavities into a pickup head or hood, wherein the articles are retained against a horizontal screen behind which a partial vacuum is maintained, transferring the articles in the pickup head to a discharge station, and cutting off the partial vacuum to enable the compacted articles to drop by gravity through the appropriate discharge ports. Such an arrangement requires providing a partial vacuum source on the apparatus, such as a vacuum pump or the like, or a connection to an external vacuum source, which is not ordinarily available in a shop or plant.

The compacted articles are usually relatively fragile and must be handled gently after ejection from the die cavities and if, for example, there is not a sufficient partial vacuum or suction within the pickup head, the compacted articles ejected from the die cavities may be dragged rather than lifted off the die plate while the pickup head is displaced from over the die cavities to the appropriate discharge ports. If this occurs, the compacted articles may be damaged or broken. Furthermore, as the suction source, such as a vacuum pump, is used solely to hold the articles within the pickup head and only gravity is used to drop the articles into receptacles, the articles cannot be directly conveyed to receptacles that are located a substantial distance from the compacting apparatus.

It would, therefore, be desirable to provide means for transferring compacted powder articles from a compacting apparatus to remotely located receptacle wherein the power for transferring the articles is obtained from a source of pressurized air, readily available in manufacturing plants.

SUMMARY OF THE INVENTION

The present invention provides a device for accomplishing such desirable results, in conjunction with a powder compacting apparatus, for transferring compacted articles ejected from a compacting apparatus, and which utilizes a common source of pressurized air to create a partial vacuum to lift the compacted articles from the apparatus die plate into a conduit to a transfer unit from which the compacted articles are propelled by a flow of air over a substantial distance for conveyance to a remotely located discharge station.

It is therefore the principal object of the present invention to provide new and improved means for collecting articles ejected from a compacting apparatus and transferring the articles for deposit at a discharge station remotely located from the compacting apparatus, without damage to the articles and with the use of a minimum amount of moving parts.

Other objects, advantages, and applications of the present invention will become apparent to those skilled in the art when the accompanying description of an example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a fragmentary, partially sectioned, top elevational view of a powder compacting apparatus provided with a part collecting and transfer system in accordance with the present invention; and FIG. 2 is a fragmentary sectional view taken generally along line 2—2 of FIG. 1.

DESCRIPTION OF THE PREFERRED EMBODIMENT

Referring now to FIGS. 1 and 2 of the drawing, a die and punch assembly 10 comprising a die plate 12, made for example of tool steel, seated in the table (not shown) of a powder compacting apparatus similar to the type disclosed in the aforementioned U.S. Patents is provided with a flat upper surface 14. The die plate 12 is mounted in or on a recess in the table of the machine by any suitable means, such as clamps, screws or the like (not shown). The die plate 12 is provided with a plurality of apertures 18 disposed in a pair of parallel rows, one only of such apertures being shown in FIG.

2. A cylindrically shaped die bushing 22, preferably formed of a hard material such as carbide, is disposed in each aperture 18 in the die plate 12 and held in place, for example, by a suitable adhesive material disposed between the outer periphery of the die bushing 22 and the surface of the aperture 18.

The upper end face of the die bushing 22 is flush with the upper surface 14 of the die plate 12. Each die bushing 22 has a centrally disposed bore 24 which may be circular, rectangular, square, oval, or of any appropriate cross section according to the desired peripheral shape of the article to be compacted therein, each defining a die cavity. A punch 28 is reciprocally mounted in the bore 24 of the die bushing 22. When it is desired to make an article provided with an aperture, such as a magnetic core, for example, a core rod, as shown at 29, is disposed in a longitudinal bore in the punch 28.

A work station positioner 32, provided with a face plate 33, is affixed at the end of an angularly movable arm 34 mounted on top of the machine table, such that the positioner 32 is arcuately displaceable over the die plate 12 with its face plate 33 in sliding engagement with the die plate upper surface 14. Two rows of powder dispensers 36 are provided in the face plate 33 of the positioner 32, such that there is a powder dispenser for each die cavity, and each row is supplied in powder from a primary powder supply (not shown) connected thereto by means of a flexible tubing 38 and a common manifold 39.

Each of the parallel rows of powder dispensers 36 is first positioned over each of the parallel rows of die cavities so as to fill the die cavities with powder as the punches 28 are displaced downwardly to draw a predetermined amount of powder into each of the die cavities. Subsequent arcuate rotation of the positioner 32 removes the dispensers 36 from above the die cavities and places an anvil surface 40 on the positioner face plate 33 over each row of die cavities, and the positioner face plate 33 is firmly applied to the upper surface 14 of the die plate 12 by a movable clamp (not shown), engaging the top of the positioner.

The powder within each die cavity is compacted against the anvil surface 40 as a result of the upward motion of each punch toward the anvil surface. Subsequent arcuate motion of the positioner 32 removes the anvil surface 40 from over the die cavities and positions a pickup head 41, formed integrally in the positioner face plate 33, over each die cavity, as shown at FIG. 2. Each punch 28 is reciprocated upwardly to the position illustrated at FIG. 2, bringing the end face of the punch substantially flush with the upper surface 14 of the die plate 12, thereby ejecting a compacted article, shown at 42, from each die cavity into the pickup head 41 which is formed integrally in the face plate 33 of the positioner 32 as an inlet aperture 44, connected by means of a passageway 45 through the body of the positioner 32, a pipe 46 and a flexible line 48 to a remotely located aspirator assembly 50.

The aspirator assembly 50 comprises a substantially elongated housing 52 provided with a longitudinal blind bore 54, closed at its open end by a closure cap 56 provided with a sealing means 57 and held in position by any conventional means, such as screws or bolts, not shown. Each line 48 is connected to the inlet of a venturi pipe 58 transversely disposed through the longitudinal bore 54 in the housing 52 and having an outlet end 60 projecting a certain distance into a passageway 62 in the form of a transverse bore disposed within the housing 52 between the longitudinal bore 54 and a line 64 leading to an appropriate receptacle, shown schematically at 66, each of the transverse bore passageways 62 having an inner diameter larger than the outer diameter of the corresponding venturi pipe 58. The longitudinal bore 54 is placed in communication by a line 68 with a source of pressurized air shown schematically at 70. The air flowing into the longitudinal bore 54 escapes into each passageway 62 through the annular space 72 formed between the outer surface of the projecting portion of each venturi pipe 58 and the inner surface of the corresponding passageway 62, and the flow of air at high velocity therethrough creates a venturi-like effect relative to each venturi pipe 58 which causes a considerable pressure drop within each pipe 58, each line 48 and each pickup inlet aperture 44. Consequently, each article 42 ejected from a die cavity into a pickup inlet aperture 44 is sucked through the passageway 45 in the positioner 32, the pipe 46 and the line 48 into the venturi pipe 58 as a result of such a drop of atmospheric pressure. Each article 42, upon reaching the venturi pipe 58, is propelled by inertia into the passageway 62 where it is subjected to the action of the stream of air flowing therethrough. The stream of air further propels the article through the passageway 62 and the line 64 into the receptacle 66.

In order to avoid any chance of the articles or parts hitting projecting portions of the system, it is to be noted that all the inlets of the pipes are flush or recessed relative to the upstream passageways or lines connected thereto, and that the inlet of the venturi pipe 58 is internally tapered as shown at 74, so as to insure a smooth transition from the internal surface of the line 48 to the inner surface of the venturi pipe 58. A groove 76 is disposed in the lower surface of the positioner 32 along the row of pickup apertures 44 to provide an unobstructed inlet for atmospheric air into the apertures.

Such an arrangement as disclosed permits to collect compacted articles, such as for example "green" magnetic cores compacted from ferrite powder, over a considerable distance to remotely located containers, one container to each die cavity, when it is considered that conveyance over a distance 40 feet (12 meters) or more is commonly achieved, using an air compressor capable of providing compressed air at 20 psi (1.4 $Kg/cm^2$) at the high pressure inlet line 68 of the aspirator assembly 50 which, by means of the structure disclosed, provides a partial vacuum in the lines 48 of 6 to 7 inches of water (about 0.18 $Kg/cm^2$). The source of compressed air may be continuously connected to the high pressure side or line 68 of the aspirator, or if so desired, the flow of air may be controlled by a valve which is actuated in time relationship with the placement of the pickup inlet apertures over the die cavities.

The mechanisms for actuating the punches 28 and the positioner arm 34 have been omitted, as they form no part of the present invention and are not necessary for the understanding of the invention.

It can thus be seen that the present invention provides a new and improved means for collecting articles compacted in a compacting apparatus and transferring the articles to a remotely located discharge station.

Although only one form of the present invention is described and illustrated, it will be obvious to those skilled in the art of powder compacting apparatus that other forms and/or modifications may be made without departing from the spirit of the invention or the scope of the appended claims.

What is claimed is as follows:

1. In a compacting apparatus for making relatively fragile articles compacted from powder material, said apparatus comprising a die plate having at least one die cavity within which said article is compacted and from which said article is ejected, a collecting system comprising a pickup head in the form of an inlet aperture in a plate in sliding engagement with said die plate and positionable over said die cavity to receive said article ejected from said die cavity, restricted passageway means for placing said inlet aperture in communication with the atmosphere, a discharge station remotely located from said pickup head, vacuum generating means disposed between said pickup head and said remotely located discharge station, first cylindrical conduit means communicating with said inlet aperture for conveying said article from said inlet aperture to said vacuum generating means, and second cylindrical conduit means communicating with said first conduit means for transferring said article to said discharge station, wherein said vacuum generating means comprises a source of pressurized air connected to aspirator means comprising a housing having a cylindrical bore connected to said source of pressurized air and at least one outlet connected to said second conduit means, said first conduit means being in axial alignment with said second conduit means and projecting into said bore transversely to said bore, said first conduit means extending beyond said bore into said second conduit means and forming with said second conduit means a cylindrical annular space permitting pressurized air to flow from said bore through said annular space between said first and said second conduit means for causing an air flow under said partial vacuum in said first conduit means for propelling said article from said pickup head to the inlet of said second conduit means and for causing a pressurized air flow in said second conduit means for propelling said article through said second conduit means one at a time into a receptacle at said discharge station, said article being caused by inertia to pass from the partial vacuum in said first conduit means to the pressurized air flow in said second conduit means.

2. In a compacting apparatus for making articles compacted from powder material, said apparatus comprising a die having at least one die cavity within which said article is compacted and from which said article is ejected, a collecting system comprising a pickup head in the form of an inlet aperture in a plate positionable over said die cavity to receive said article ejected from said die cavity, a discharge station remotely located from said pickup head, vacuum generating means disposed between said pickup head and said remotely located discharge station, first conduit means communicating with said inlet aperture for conveying said article from said inlet aperture to said vacuum generating means, and second conduit means communicating with said first conduit means for transferring said article to said discharge station, wherein said vacuum generating means comprises a source of pressurized air connected to aspirator means comprising a housing having a bore connected to said source of pressurized air and at least one outlet connected to said second conduit means, said first conduit means being in axial alignment with said second conduit means and projecting into said bore transversely to said bore, said first conduit means extending beyond said bore into said second conduit means and forming with said second conduit means an annular space permitting pressurized air to flow from said bore through said annular space between said first and said second conduit means for causing an air flow under said partial vacuum in said first conduit means for propelling said article from said pickup head to the inlet of said second conduit means and for causing a pressurized air flow in said second conduit means for propelling said article through said second conduit means one at a time into a receptacle at said discharge station, said article being caused by inertia to pass from the partial vacuum in said first conduit means to the pressurized air flow in said second conduit means, wherein said die plate has a plurality of die cavities and said pickup head has a plurality of inlet apertures each adapted to be positioned over and aligned with one of said die cavities, a plurality of said first and conduit means is connected between said inlet apertures and said aspirator means such that each of said inlet apertures leads into one of said first conduit means connected to said aspirator means, and there is provided a plurality of said second conduit means each corresponding to one of said first conduit means and each leading into a separate receptacle at said discharge station, each of said first conduit means projecting transversely to said bore of said aspirator means housing into one of said second conduit means such as to form said annular space therebetween.

3. In a compacting apparatus for making articles compacted from powder material, said apparatus comprising a die plate having a plurality of die cavities within which said articles are compacted and from which said articles are ejected, a pickup head positionable over said die cavities and having a plurality of separate collecting apertures each alignable with one of said die cavities for receiving a compacted article ejected from said die cavity, and a discharge station remotely located from said compacting apparatus to receive compacted articles conveyed thereto, the improvement for conveying said compacted articles from said compacting apparatus to said remotely located discharge station comprising:

a housing remotely located from said discharge station;

a pressure bore disposed in said housing;

a source of pressurized air connected to said pressure bore;

a plurality of transverse bores in said housing, each transversely disposed relative to said pressure bore and in fluid communication therewith;

a tubular member axially aligned with and axially projecting a distance beyond said pressure bore within each of said transverse bores such as to form an annular clearance space between the peripheral surface of said tubular member and the inner surface of said transverse bore for permitting pressurized air to pass from said pressure bore into said transverse bore through said annular clearance space for causing an air pressure lower than atmospheric pressure within said tubular member causing an air flow in said tubular member toward the outlet of said tubular member and an air pressure higher than atmospheric pressure in said transverse bore causing an air flow in said transverse bore away from the outlet of said tubular member;

a plurality of first conduits each connecting one of said pickup head collecting apertures to one of said tubular members for carrying said compacted article by air flow through each of said first conduits from one of said collecting apertures to the outlet of said tubular member;

a plurality of second conduits each connected to the outlet of one of said transverse bores for receiving said article transferred by inertia from said tubular member to said transverse bore and for carrying said article by air flow therefrom to said remotely located discharge station; and a plurality of receptacles at said remotely located discharge station each disposed at the outlet of one of said second conduits;

whereby each compacted article is conveyed individually from said compacting apparatus to said remotely located discharge station such that articles ejected from a single die cavity are collected in a corresponding single receptacle and each article is individually transferred through said housing from said tubular member with air flow at a pressure lower than atmospheric pressure to said transverse bore with air flow at a pressure higher than atmospheric pressure.

* * * * *